United States Patent
Robinson et al.

(10) Patent No.: US 7,558,406 B1
(45) Date of Patent: Jul. 7, 2009

(54) SYSTEM AND METHOD FOR EMPLOYING USER INFORMATION

(75) Inventors: Timothy L. Robinson, Reston, VA (US);
Bradford R. Schildt, Boulder, CO (US);
Tennille V. Goff, Springfield, VA (US);
Daniel J. Corwin, Ashburn, VA (US)

(73) Assignee: YT Acquisition Corporation, Delray Beach, FL (US)

( * ) Notice: Subject to any disclaimer, the term of this patent is extended or adjusted under 35 U.S.C. 154(b) by 749 days.

(21) Appl. No.: 10/910,514

(22) Filed: Aug. 3, 2004

(51) Int. Cl.
*G06K 9/00* (2006.01)

(52) U.S. Cl. ...................... 382/115; 382/124

(58) Field of Classification Search ........... 382/100, 382/115–124, 209, 218; 340/5.2, 5.21, 5.52, 340/5.53; 713/186; 902/3
See application file for complete search history.

(56) References Cited

U.S. PATENT DOCUMENTS

| | | | | |
|---|---|---|---|---|
| 5,067,162 A * | 11/1991 | Driscoll et al. | ............... | 382/126 |
| 5,679,940 A | 10/1997 | Templeton et al. | | |
| 6,554,705 B1 * | 4/2003 | Cumbers | ............... | 463/29 |
| 6,591,249 B2 * | 7/2003 | Zoka | ............... | 705/18 |
| 6,871,287 B1 | 3/2005 | Ellingson | | |
| 6,985,608 B2 * | 1/2006 | Hoffman et al. | ............... | 382/115 |
| 7,068,145 B2 * | 6/2006 | Reitmeier | ............... | 340/5.53 |
| 7,110,580 B2 * | 9/2006 | Bostrom | ............... | 382/124 |
| 7,154,375 B2 * | 12/2006 | Beenau et al. | ............... | 340/5.53 |
| 7,308,581 B1 * | 12/2007 | Geosimonian | ............... | 713/186 |
| 2002/0010862 A1 * | 1/2002 | Ebara | ............... | 713/186 |
| 2002/0112177 A1 * | 8/2002 | Voltmer et al. | ............... | 713/200 |
| 2002/0194122 A1 * | 12/2002 | Knox et al. | ............... | 705/39 |
| 2003/0005326 A1 * | 1/2003 | Flemming | ............... | 713/201 |
| 2004/0193893 A1 * | 9/2004 | Braithwaite et al. | ............... | 713/186 |
| 2005/0246291 A1 | 11/2005 | Delgrosso et al. | | |

OTHER PUBLICATIONS

S. Davies. Touching Big Brother. How Biometric Technology Will Fuse Flesh and Machine. Information Technology & People. vol. 7 (4) 1994.

Lawrence Aragon. Show me some ID. PC Week Online (http://www.zdnet.com/pcweek/0112/12bio.html) Jan. 1998.

Gerald Lazar. Agencies Scan Biometrics for Potential Applications. FCW.com (http://www.fcw.com.pubs.few.1997/0120/feature.htm) Jan. 1997.

Comparison of Biometric Identification Methods. http://www.and.nl/id/gen_biom.html. Dec. 1998.

The Speech Recognition API (SRAPI) Committee Announces Support for Speaker Verification. http:/www.srapi.com/svapipr.html. Oct. 1996.

New Technology Enables Computers to Identify, Verify User Voices. http://www.srapi.com/savpi/pr041597.html. Apr. 1997.

Accounting 5544. Biometric Technology. http://acctserver.cob.vt.edu/faculty.jhicks/acct5544/present/ddeverea.htm. Apr. 1997.

(Continued)

*Primary Examiner*—Daniel G Mariam
(74) *Attorney, Agent, or Firm*—Pepper Hamilton LLP

(57) ABSTRACT

A system and method of employing user information during a biometric authorization. A user's biometric system records and biometric third party records are monitored for negative, positive, and neutral data in order to maintain user record accuracy and to prevent fraudulent behavior.

45 Claims, 2 Drawing Sheets

OTHER PUBLICATIONS

Vault FAQs. http://www.ImagineNation.com/Xanadu/Vault. Jun. 1997.

John Daugman. The Scientific Basis for Iris Recognition. Http://www.iriscan.com/basis.htm. Dec. 1998.

Electronic Banking 1. http://www.sjb.co.uk/eb1.html. Aug. 1998.

Biometric Technology Today (Btt). vol. 6(5) Sep. 1998.

Biometric Digest. Mar. 1998.

Biometrics in Human Services. vol. 2(1) Feb. 1998.

\* cited by examiner

SYSTEM AND METHOD FOR EMPLOYING USER INFORMATION

FIELD OF THE INVENTION

This application relates generally to authorizations in a biometric system. More particularly, the present invention relates to a system and method of employing user information during a biometric authorization.

BACKGROUND OF THE INVENTION

Generally, a biometric authorization system performs an examination of an individual enrolling in the system. This examination searches system records to ensure that the enrolling individual is not already registered with the system. To ensure a timely and inexpensive enrollment, a system may only search a limited amount of system records, such as those known to contain negative information. This may allow an unscrupulous user with no current negative history to enroll multiple times. In addition, such a system lacks a means to ensure users remain in good standing during subsequent authorizations. Moreover, an individual may employ more than one biometric system and thus may have a favorable status in one system, while having negative status in another. Such a user may be able to perform activities that would have been prohibited had the first system been aware of the negative data in the second system. What is needed therefore is a system and method to enable a biometric authorization system to examine user information held in the first system and at third party sources.

SUMMARY OF THE INVENTION

The present invention addresses the aforementioned needs by providing a system and method to employ user biometric data to examine user information found in both system and third party records. The present invention provides a flexible process by which positive, negative, and neutral user information may be utilized to monitor system users during authorizations in a biometric authorization system.

BRIEF SUMMARY OF THE DRAWINGS

In order to describe the manner in which the above-recited and other advantages and features of the invention can be obtained, a more particular description of the invention briefly described above will be rendered by reference to specific embodiments thereof that are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE INVENTION

Figure 1:
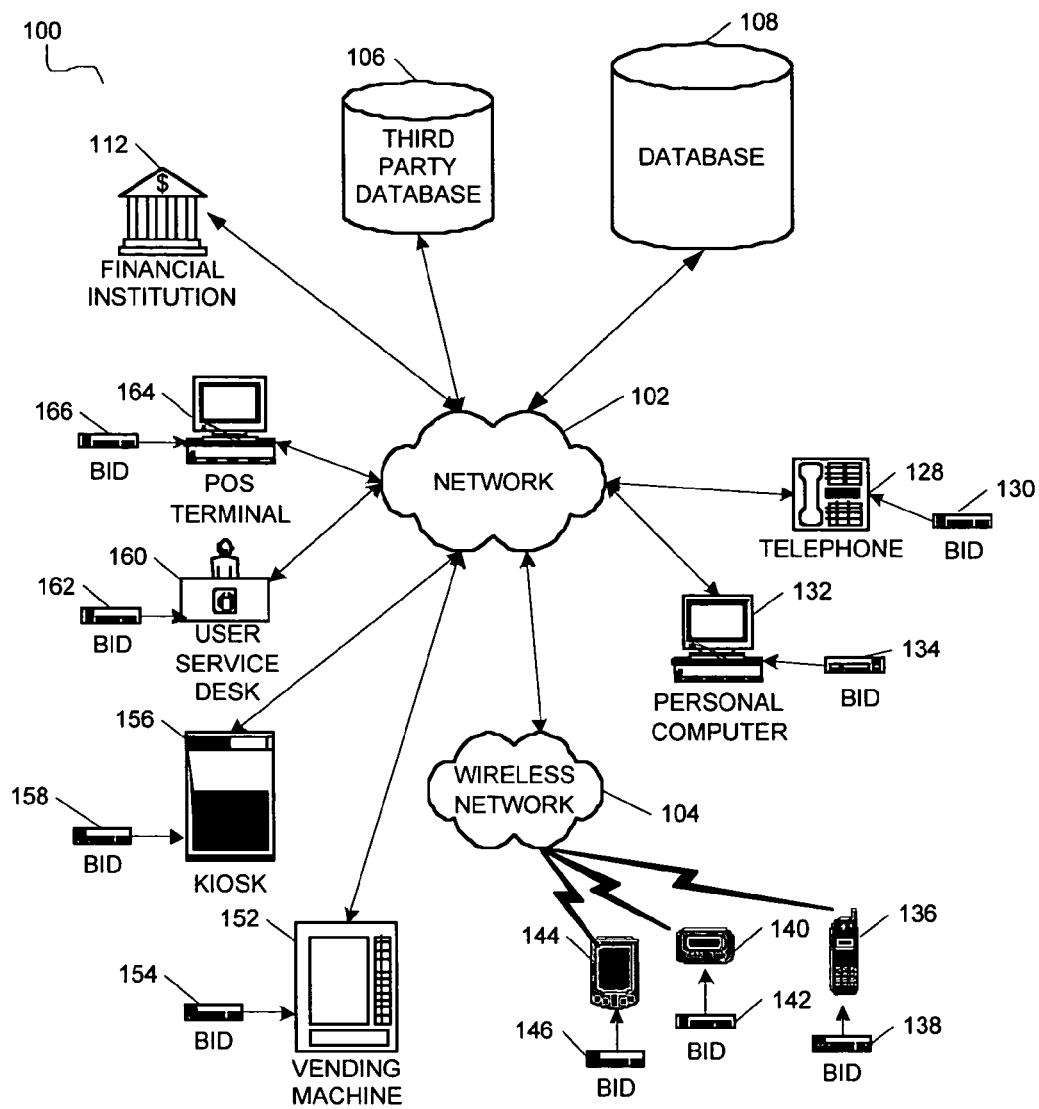
FIG. 1 illustrates a general architecture overview of a biometric authorization system.

Additional advantages and objects of the present invention will be apparent in the following detailed description read in conjunction with the accompanying figures.

Biometric systems provide the security of employing biometric data at each authorization. These authorizations may be financial transactions, access procedures, age verifications and the like. However, although securer than standard authorizations, unscrupulous users may still defraud the system. A user may be in good standing during enrollment but acquire negative information during subsequent authorizations. Negative information may include any user information indicative of fraudulent activity or financial troubles, such as previously declined enrollments or unsettled transactions. In general, biometric authorization systems are not configured to account for this situation in the authorization process. In one embodiment, the present invention resolves this problem by monitoring user information when a user performs authorizations in a biometric system. If the system discovers that negative information exists, the associated user record(s) may be marked negative, flagged for further review, disabled to prevent further use, or the system may ensure the user meets certain conditions before completing an authorization.

Additionally, an iniquitous user may enroll in a biometric authorization system with fraudulent identity information in an attempt to defeat the system's security measures. In order to alleviate this problem, in one embodiment, the present invention employs the biometric data utilized at an authorization to search for multiple matching records. The biometric data employed may be biometric data received from the user at the time of the authorization, biometric data registered during enrollment, or a combination thereof. If one or more duplicate records are found, the system may evaluate the user information to determine if one may be fraudulent. This prevents individuals from using multiple biometric accounts in the system and may notify legitimate users that someone else has enrolled in the system using their identity information.

In addition, although a user may not have negative information in one biometric system, he may have negative information in another biometric system. In general, conventional biometric authorization systems do not account for this situation and therefore may authorize individuals, even though the user may be performing illegal activities in another biometric system. To prevent this, in one embodiment, the present invention may examine third party information during biometric authorizations. The system utilizes a user's biometric data to search third party sources, which can be any source of knowledge that is external to the system database. For example, a third party source may be a token, a third party database, or an individual. If a user's biometric data matches one or more records in a third party database, the system may examine this information for negative data. If negative data is present, the system may prevent the user from completing an authorization or require him to agree to certain conditions in order to complete it.

In addition to monitoring user system records and third party records for negative user data, in one embodiment, the present invention provides a system and method for analyzing positive user information. Positive information can be any user information reflective of an individual in good standing with a biometric system, such as successful authorizations and customer loyalty information. By tracking positive information both within the system and within third party records, the system may encourage users to employ the biometric system by rewarding them for positive behavior. For example, while authorizing a user's purchase, the system may recognize that the user has made several purchases at that particular merchant location and thus offer the user a discount. Because the system monitors both system and third party records, the positive information may provide for synergy between multiple systems. For example, a user may undergo a financial biometric authorization when purchasing an airline ticket. While performing this authorization, the system may recognize the user has positive information in a government security database and offer the user expedited check-in service because the user meets certain security requirements.

In one embodiment, the present invention also provides a system and method for tracking neutral user information. Neutral information can represent user identity information, such as name, address, and social security number, as well as other such user data. By monitoring this data, the system may ensure that user records contain current and accurate information. When a user performs a biometric authorization, the system may examine system and third party records that correspond with the user's biometric data. The system may check to ensure that neutral information corresponds between the matching system and third party records. For example, the system may check that both records contain the same address, phone number and email address. If they do not, the system may flag the associated records for further action. Depending upon the degree of the discrepancy, the system may request a system operator or the system user to take appropriate action. For example, if the address in one record does not correspond with the address of the other, the user may be prompted to select which address is current. However, if the system determines that the discrepancy between the records is too great, the system operator may be required to take action. For example, the social security number listed in one record may not match the social security number found in the other. The system operator would then take steps to determine which social security number is correct and whether or not one of the associated records is fraudulent. If the information denotes fraudulent behavior, the system operator may take appropriate action, such as notifying the appropriate authorities. In one scenario, the user may not be allowed to complete an authorization until the matter has been resolved. Alternatively, the user may be allowed to complete the transaction only after agreeing to certain conditions.

In addition to checking for negative, positive, and neutral user information at biometric authorizations, in one embodiment, the system may also be configured to inspect system and third party records for such data periodically. If information is found, the system may update the user's system record or any corresponding user records so that all records denote this data. In the event of negative information, the corresponding user records may also be flagged and deactivated until further review by a system operator, a system user, or a third party entity. If the system locates neutral information that does not correspond, the system record may be flagged for further review by a system operator or a system user.

In general, a biometric authorization refers to an authorization in which the user provides biometric data to be matched against a biometric record in a database. For example, a user may undergo biometric authorization to complete a financial transaction or to gain access to an age-restricted location. As would be appreciated, the location of the database as well as the specific mechanism by which the biometric data is matched to a particular biometric record would be implementation dependent and would not be limiting on the scope of the present invention. Thus, in a biometric authorization, the biometric data taken during the authorization can be matched against registered biometric data at a location where the registered biometric data is stored or where the authorization biometric data is gathered. In addition, biometric data received during an authorization may be tested for liveness to prevent system fraud.

Additionally, the principles of the present invention are not limited to using one form of biometric. For example, the biometric data referred to throughout this description can represent a biometric image (or sample) and/or a mathematical representation of the biometric image, often referred to as a biometric "template". In one example, a biometric template can represent any data format that includes feature, positional, or other representing information of characteristics of biometric data. Alternatively, a template may be a mathematical representation of more than one biometric. For example, a user template may be generated from biometric data acquired from two individual fingers, such as a thumb and index finger, or from a finger and an iris scan. The biometric data may include fingerprint data, iris data, facial data, voice data, retinal data, hand architecture data, DNA data, or any other physical measurement pertaining to a user's person.

FIG. 1 illustrates a general architecture overview of biometric authorization system 100. As will be described in greater detail below, biometric authorization system 100 enables a flexible process by which user records may be monitored for negative, positive, and neutral information. User information is stored in database 108 where system user records are stored. Database 108 may represent one or more databases utilized within the system. In one embodiment, database 108 is a central database to which all system user records are stored and from which system user records are accessed for biometric authorization. In another embodiment, database 108 also includes one or more operator databases to which a select set of system operator records are stored and from which a select set of system operator records are accessed for biometric authorization. In an additional embodiment, biometric authorization system 100 may also utilize a combination of central databases and one or more operator databases. In general, embodiments utilizing a combination of system databases enable increased control of information flow throughout biometric authorization system 100. As described in greater detail below, various examples of information flow configurations within the system can include "open," "closed," and "selectively shared" system models. In still further embodiments, database 108 can further comprise one or more sub-databases that are contained within a particular database. In such embodiments, system user data, system operator data, and other system data may be distributed across multiple databases within the system database. Additionally, in another embodiment, database 108 may store third party information. For example, third party information may be purchased by the system provider and transferred to a system sub-database, but may not be integrated into system user records.

A system user record holds system user biometric information and other identity verifying information related to an individual seeking biometric authorization within the system. This identity verifying information may be considered neutral user information. The information held in such a record may include, by way of illustration and without limitation, a system user's government identification number(s) and corresponding state(s) of issue, home address, email address, a telephone number, and at least one biometric record. When enrolling in biometric authorization system 100, a system user may present any number of identity verifying documents or testaments to his identity depending on the implementation of the biometric system. By way of illustration and not of limitation, examples of such documents or testaments include a financial token, a digital image, a video clip, family information, or a DNA sample. Depending on the particular implementation, a system user record can also hold financial account information and/or a system identification number (SID). An SID is a code used in conjunction with a system user biometric presentation for authorization. In addition, a system user record may hold additional information, such as negative, positive, and additional neutral information acquired during authorizations subsequent to enrollment. As would be appreciated, the specific mechanism by which the additional information is acquired and stored in a system user record would be implementation dependent and would not be limiting on the scope of the present invention.

Additionally, system user records are marked according to various states of activity in a biometric authorization system. Such states may include but are not limited to pre-active, active, flagged, and negative. Pre-active system user records include those where a system user record has been created and the record has not been enabled. Active system user enrollment records include those where a system user record has been created and is enabled for use. After a system user record includes enabling enrollment information, the system user record is marked active, and a history of the record's activity is stored in the system user record. Flagged system records include those that have been deemed to be in need of further review, such as records whose authenticity is in question or records that may contain negative information. Negative system user records include those where a system user record has been created but fraud regarding information presented for storage or stored in that record has been detected.

A system operator record holds information useful for authenticating an operator, such as a name or ID number, device ID numbers associated with the operator, an address, and a phone number. A system operator may be an individual or entity that has administrative capabilities in a biometric authorization system. These capabilities may range from being permitted to oversee a biometric authorization to having access to system user records. For example, a system operator may be a store clerk, a merchant, or a system provider administrator. In an alternate embodiment of the present invention, the operator records also hold employer information if the operator is an employee of an employer who is also an operator. In another embodiment of the present invention, operator records hold an operator SID and/or operator biometric data. In one scenario, a system operator may need to undergo biometric authorization before overseeing a user's biometric authorization.

Database 108 is connected to network 102, which may be, but is not limited to, the Internet. Network 102 comprises connections to at least one authorization station where a system user may be biometrically authorized. Authorization stations are composed of at least one biometric input device (BID) and the necessary means for sending and receiving information to and from a system user and to and from a database. These stations include but are not limited to vending machine 152, kiosk 156, personal computer 132, user service desk 160, point of sale terminal 164, or wireless device 136, 140, 144, connected via wireless network 104, with respective biometric input devices (BIDs) 154, 158, 134, 162, 166, 138, 142, and 146. BID devices are illustrated in FIG. 1 as peripheral devices for purposes of emphasis only. An authorization station could also include an integrated BID.

Networks used in additional embodiments include LANs (local area networks), WANs (wide area networks), and telephone networks. In one example, system users communicate with database 108 via telephone 128, with connected BID device 130.

Additional embodiments of the system also comprise connections to one or more third party sources, such as third party database 106, in which system user information, including user biometric data, is verified and/or from which system user information is retrieved. In another embodiment, a third party source can further comprise one or more sub-databases that are contained within a particular third party source. In such embodiments, third party user data, third party operator data, and other third party data may be distributed throughout a third party system.

In an additional embodiment, the system may be connected to one or more financial sources, such as financial institution 112, in order to facilitate biometric financial transactions. For example, a system user record stored at database 108 may indicate an account held at financial institution 112 that is to be debited during a biometrically authorized purchase.

Authorization information transferred in the system may be encrypted. For example, information may be encrypted at one point and sent across a non-secure connection between points or not encrypted at a point of communication and sent to the other point of communication across a secure connection. Encryption and decryption of these messages may be monitored by services provided by a security company such as VeriSign. In one scenario, as an added level of security, information internal to a terminal and which is never transmitted may also be encrypted. This prevents retrieval of sensitive information (e.g., biometric data) from a stolen terminal. In an additional embodiment, the system incorporates one or more anti-tampering methods by which to recognize authentic and non-authentic system requests.

In one embodiment, the system is configured as an "open" system, meaning all information entered into the system is transmitted to and stored in database 108. An open system allows authorization at any authorization station in the system because an open system shares system user information stored in database 108 with all stations.

In an alternate embodiment, the system is configured as a "closed" system, meaning information entered into the system via a specific operator device is transmitted to and stored in database 108 specific to that operator, and this information is not shared with other authorization stations or other system databases. This is referred to as a "closed" system because system users who are enrolled in a database for one system operator must be enrolled in the database of each additional system operator in which they would like to perform biometric authorizations. Database 108 in closed systems may query other databases, such as third party database 106. However, all system user information that is enrolled into a particular operator system database is stored in that database. In an alternate embodiment of the closed system, information pertaining to specific system operators is stored in a partitioned database 108. System operator related information is stored in system, operator-specific partitions and is closed to all other system operators. Only the system operator, system operator employees, and authorized entities may access that partition of database 108. In yet an additional embodiment, system operator related information stored in an operator system database is additionally stored on database 108 where their system users' records are stored. Such an embodiment is useful for information protection in the event database information is lost.

In a further embodiment of the present invention, system user information is "selectively shared" and stored in select system multiple-operator databases or select, system multiple-operator partitions within database 108. In this embodiment, a group of system operators share data with each other and they choose whether or not to share system information with other system operators within the system. Such a system is referred to as a "selectively shared" system. This system allows a chain of system operators owned by the same entity or linked in some other manner to share system user information amongst them without sharing that information with all other non-designated system operators registered in the system. Information in such a system may be shared between one or more databases freely or sharing may be monitored by rules set in one of these databases or a combination thereof. By way of illustration and not as a limitation, one system operator might only want to share system user authorization information with one of five system operators in a multi-verifier system or all system operators might not want to send or store system user authorization information to database 108. Such a system allows system operators greater control over information flow while still allowing various user conveniences, such as being able to undergo biometric authorization at any store in a selectively shared chain.

The configuration of the system as an "open" system, "closed" system, or "selectively shared" system illustrates various ways of implementing the principles of the present invention. System configuration might be determined by the system in which user information is used. For example, a merchant who is an operator in the system and who conducts biometrically authorized customer loyalty programs might have a system configured with his own database 108 and authorization stations connected to that database. In this system configuration, the merchant's database files only exist on database 108 and are retrieved or accessed for biometric authorization only by pre-determined stations connected to database 108; therefore, the system would be a "closed" system.

Figure 2:
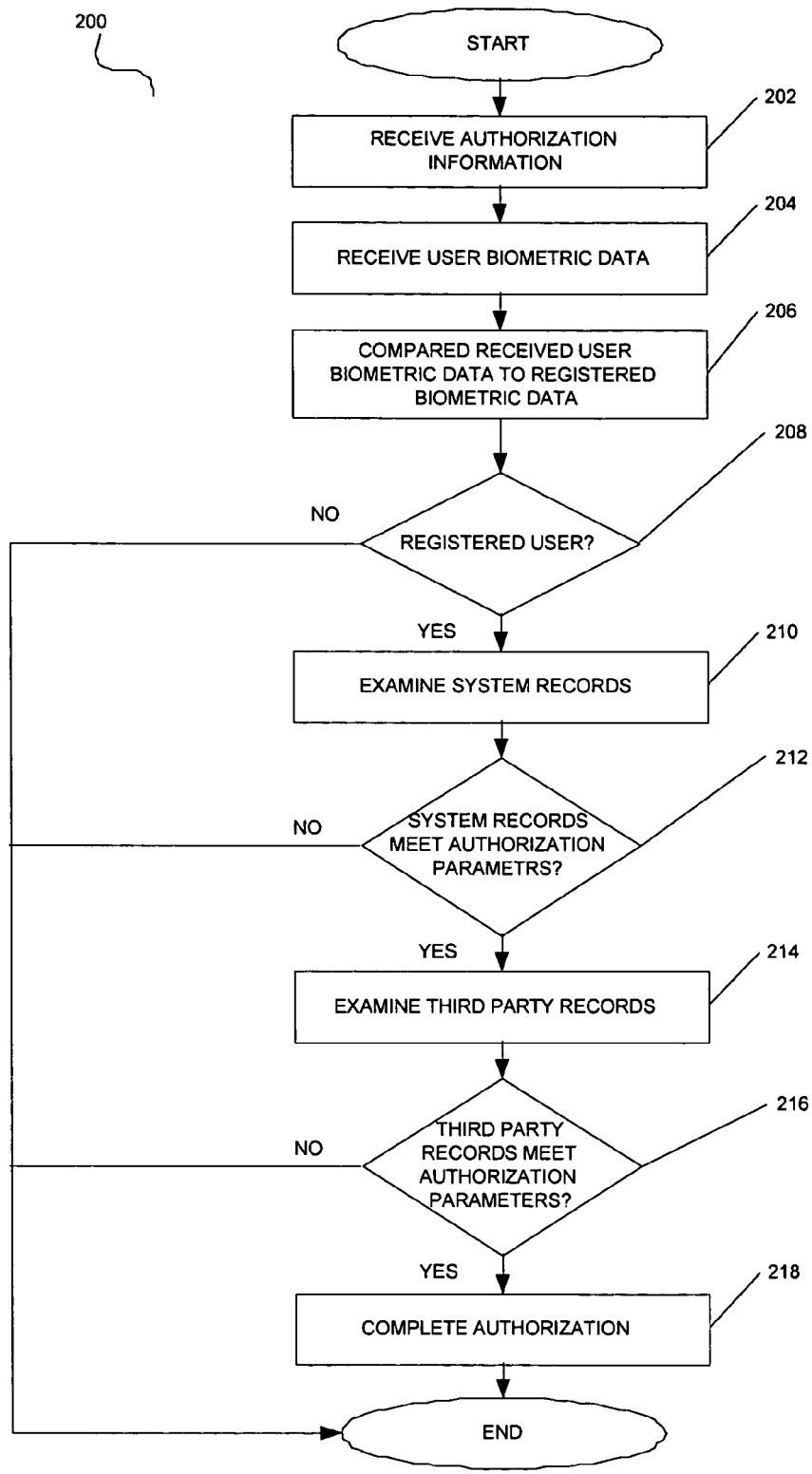
FIG. 2 illustrates an authorization in a biometric authorization system in which user information is examined.

FIG. 2 illustrates an authorization in a biometric authorization system in which user information is examined. At step 202, the system receives information pertaining to a biometric authorization request. This authorization request may be a biometrically authorized financial transaction, an age-verification transaction, an access operation or the like. The system receives any information pertaining to the authorization request that may be pertinent for biometric user record verification. At step 204, the system receives the user's biometric data. This data may be received at an authorization station, such as those illustrated in FIG. 1.

As illustrated by step 206, the received biometric data is compared against the registered biometric data stored in an associated user record. If the biometric data sufficiently matches to meet a system requirement, the user is confirmed as a registered user, as shown at step 208. After recognizing the user as registered, the system may examine system records for negative, positive, and/or neutral information at step 210. In one embodiment, the system only examines negative records. The system may search the associated user record as well as other system records containing corresponding biometric data. The biometric data employed may be biometric data received from the user at the time of the authorization, biometric data registered during enrollment, or a combination thereof. In one embodiment, the database examined is determined by system parameters, such as information pertaining to the authorization and user information. For example, a system parameter may be the type of authorization, system operator information, and, in the case of a financial transaction, the transaction amount or the type of payment. If negative, positive, and/or neutral information is located in a system record, the system determines whether this information meets authorization parameters at step 212.

If negative information is found, the authorization may be denied. Alternatively, if negative information is located in a system record, the user may only be allowed to complete the authorization after consenting to one or more conditions. Such a condition may be paying a fee, placing a security deposit, or consenting to an agreement. In one scenario, the agreement may be to maintain a positive standing within the system for a set period of time. If the user fails to meet this requirement, his access to the biometric system may be revoked and/or he may be charged a fee. If positive information is located, the authorization may proceed. Alternatively, the user may be offered a promotion based upon this positive information. For example, the user may be offered a discount, a coupon, a gift, an incentive, a contest offer, a merchant group promotion, or a loyalty program.

If the system locates neutral information, the system may compare the neutral information to determine why a duplicate record exists and whether or not the neutral information is indicative of fraudulent behavior. A duplicate system record may exist if the database is partitioned or if a user has enrolled multiple times. A user may have enrolled more than once unintentionally or an unscrupulous user may have done so in an attempt to defraud the system. A user may have enrolled multiple times by providing different information at each enrollment. For example, a user may have entered different identification information or a different SID number upon enrollment. If a system record is determined to be questionable upon a comparison of neutral information, the user may be prevented from completing the biometric authorization until the issue is resolved or may be permitted to complete the authorization after agreeing to certain conditions. If a duplicate record is determined to be legitimate but redundant, the system may deactivate the redundant record or delete it.

At step 214, the system may examine third party records for negative, positive, and/or neutral information. In one embodiment, the system only examines negative records. The system may search third party sources linked to the system for one or more user records containing biometric data corresponding to the user's biometric data. The biometric data employed may be biometric data received from the user at the time of the authorization, biometric data registered during enrollment, or a combination thereof. In one embodiment, the third party sources that are examined are determined by system parameters, such as information pertaining to the authorization and user information. If negative, positive, and/or neutral information is located, the system determines whether or not this information meets authorization parameters at step 216.

If negative information is found, the authorization may be denied or the user may only be allowed to complete the authorization after consenting to one or more conditions. Such a condition may be paying a fee, placing a security deposit, or consenting to an agreement. If positive information is located in one or more third party records, the authorization may proceed. Alternatively, the user may be offered a promotion based upon this positive information. For example, the user may be offered a discount, a coupon, an incentive, a gift, a contest offer, a merchant group promotion, or a loyalty program. If the system locates neutral information, the system may compare the neutral information to determine if the third party record contains information that the user record does not and whether or not the neutral information is indicative of fraudulent behavior. If a third party record and/or the user record is determined to be questionable based upon a comparison of neutral information, the user may be prevented from completing the biometric authorization until the issue is resolved or may be permitted to complete the authorization after agreeing to certain conditions.

As will be appreciated, the particular order in which system records and third party records are utilized is implementation dependent and the aforementioned steps are structured for illustrative purposes only. For example, the system may examine third party records before examining system records, or may examine all associated records concurrently.

After the system has determined that authorization parameters have been met, the authorization is completed accordingly at step 218. In one embodiment, the user record may be updated with the positive, negative, and/or neutral information located in system records or third party records. The system may compare the user record with system records and third party records and update the user record accordingly. In one scenario, the user record is updated with information in a system or third party record that it does not contain. In another scenario, the entry date of the user record information is compared to that of the system or third party record and the user record is updated to ensure it contains the most up-to-date data. Other system records may also be updated, thus ensuring that all of the user's system records contain the same data. Additionally, if a third party system permits such activity, a third party record may also be updated.

In addition to monitoring user information during biometric authorizations, the system may also check system records and/or third party records at periodic intervals for negative, positive, and/or neutral information. This may be an automatic process or may be initiated by a system operator or a system user. If the process is automatic or handled by a system operator, the user may consent to the process during enrollment. Additionally, the system may check system records and/or third party records as part of an enrollment process. In one scenario, the system performs a cursory record search during enrollment and then performs a more thorough search of system and third party records at a later time. This configuration may allow a system to delay a time-intensive record search until a more suitable time, such as after business hours.

If negative information is found, the user's record may be flagged for further review by a system operator. If a user's record is flagged, the system user may be notified, such as by mail, email, phone, or at a subsequent biometric authorization. The system user may be allowed to continue utilizing the biometric authorization system by consenting to one or more stipulations, such as paying a fee, or consenting to an agreement. If positive information is located, the system may designate a promotion to be offered to the user at a subsequent authorization. Neutral information may be used to verify data in a user's record. If neutral information from one or more associated records does not correspond, the user may be prevented from being biometrically authorized until the issue is resolved. If a duplicate system record is determined to be redundant, the system may deactivate the redundant record or delete it. Additionally, the system may compare the user record with corresponding system and third party records and update the user record accordingly. In one scenario, the duplicate system records and/or third party records may also be updated to correspond with the user record.

In an additional embodiment of the present invention, the system may evaluate a user's system and third party records to determine which to employ. During an authorization, after receiving the user's biometric data, the system locates the user's system and/or third party records associated with the received biometric data. The record used may be determined by examining the information contained within the record, the source of the record, the newness of the record, and other such factors. In one scenario, the record may be selected based upon information pertaining to the authorization. Alternatively, the system may determine which user record to employ during a periodic examination of a user's system and third party records.

In addition to utilizing third party information during authorizations subsequent to enrollment, third party information may be employed during the enrollment process. In one embodiment, at enrollment, a system user presents biometric data to be registered in a system record. The system may search third party sources linked to the system for one or more user records containing biometric data corresponding to the user's biometric data. In one embodiment, which third party sources are examined is determined by system parameters, such as information pertaining to the enrollment and user information. If negative, positive, and/or neutral information is located, the system determines whether or not this information meets enrollment parameters. In one embodiment, the system only searches for negative information.

If negative information is found, the enrollment may be denied or the user may only be allowed to complete the enrollment after consenting to one or more conditions. Such a condition may be paying a fee, placing a security deposit, or consenting to an agreement. If positive information is located in one or more third party records, the enrollment may proceed. Alternatively, the user may be offered a promotion based upon this positive information. For example, the user may be offered a discount, a coupon, an incentive, a gift, a contest offer, a merchant group promotion, or a loyalty program. If the system locates neutral information, the system may compare the neutral information to determine if the third party record contains information that the user did not present and whether or not the neutral information is indicative of fraudulent behavior. If a third party record and/or the user record is determined to be questionable based upon a comparison of neutral information, the user may be prevented from enrolling until the issue is resolved or may be permitted to complete the enrollment after agreeing to certain conditions.

A system and method for employing user information in a biometric authorization system has been illustrated. It will be appreciated by those skilled in the art that the system and method of the present invention can be used to monitor system users in a biometric system. It will thus be appreciated by those skilled in the art that other variations of the present invention will be possible without departing from the scope of the invention disclosed.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention. Therefore, the above description should not be considered to be exclusive of these other embodiments. Also, it is to be understood that the phraseology and terminology employed herein are for the purposes of description and should not be regarded as limiting.

What is claimed is:

1. A method for conducting an authorization in a biometric system, the method comprising:
   receiving an authorization request from a user, said authorization request including user biometric data;
   identifying a first biometric record in a first biometric system associated with said user;
   identifying a second biometric record in a second biometric system associated with said user;
   making a first determination as to whether data contained in said first biometric record matches data contained in said second biometric record;
   making a second determination as to whether one or more of said first biometric record and said second biometric record meet one or more authorization parameters; and
   granting said authorization request based upon said first and second determinations.

2. The method of claim 1, wherein said authorization data request is encrypted.

3. The method of claim 1, further comprising receiving an identification number from one or more of said user and a system operator.

4. The method of claim 1, wherein said user biometric data comprises a plurality of biometric data of a single biometric type.

5. The method of claim 1, wherein said user biometric data is one or more of fingerprint data, iris data, facial data, voice data, retinal data, hand architecture data, and DNA data.

6. The method of claim 1, wherein said identifying a first biometric record in a first biometric system comprises comparing said user biometric data to registered biometric data associated with the first biometric record.

7. The method of claim 6, wherein said comparing transpires at a local device.

8. The method of claim 6, wherein said comparing transpires at a database.

9. The method of claim 6, further comprising determining which biometric record to employ for said comparison.

10. The method of claim 9, wherein said determining is based upon one or more of a record robustness, a record date, and a record source.

11. The method of claim 1, wherein said second biometric record is a system record.

12. The method of claim 1, wherein said second biometric record is a third party record.

13. The method of claim 1, wherein said second biometric record is updated to correspond with said first biometric record.

14. The method of claim 1, wherein said authorization parameters include one or more of a transaction amount, an authorization type, a payment type, merchant information, a system operator identification number, and system operator biometric data.

15. The method of claim 1, wherein said second biometric record includes one or more of positive information, negative information, and neutral information.

16. The method of claim 1, wherein if the data contained in said first biometric record does not match data in said second biometric record, then at least one of said first and second biometric records are marked for further review.

17. The method of claim 1, wherein said one or more authorization parameters comprise the presence of positive information.

18. The method of claim 17, wherein if said positive information is present, said user is offered a promotion.

19. The method of claim 18, wherein said promotion includes one or more of a discount, a coupon, a gift, a contest, a merchant group promotion, an incentive, and a customer loyalty program.

20. The method of claim 1, wherein said one or more authorization parameters comprise the presence of negative information.

21. The method of claim 1, wherein said one or more authorization parameters comprise the presence of neutral information.

22. The method of claim 1, further comprising storing data pertaining to said authorization.

23. A method for authenticating a biometric user record, the method comprising:
retrieving a first biometric user record associated with a user from a first biometric system at a second biometric system, said retrieval occurring apart from a biometric authorization transaction; and
determining whether a second biometric user record exists for said user in the second biometric system that includes additional pieces of positive information, negative information, or neutral information for said user.

24. The method of claim 23, wherein said determining transpires on a periodic basis subsequent to enrollment in a biometric authorization system.

25. The method of claim 23, wherein said determining transpires as a delayed enrollment step in a biometric authorization system.

26. The method of claim 23, wherein if said second biometric user record has information not found in said first biometric user record, then updating said first biometric user record with said information.

27. The method of claim 23, wherein if said first biometric user record has information not found in said second biometric user record, then updating said second biometric user record with said information.

28. The method of claim 27, wherein said information is one or more of positive information, negative information, and neutral information.

29. The method of claim 23, further comprising determining which biometric user record to employ at a biometric authorization.

30. The method of claim 29, wherein said determining is based upon one or more of a record robustness, a record date, and a record source.

31. The method of claim 23, wherein if information located in one of said biometric user records is not located in another of said biometric user records, then marking one of said biometric user records for review by one or more of a system operator, a system user, and third party entity.

32. The method of claim 23, further comprising receiving a user consent to said determining upon enrollment in a biometric authorization system.

33. A method for enrolling in a biometric authorization system, the method comprising:
receiving, at the biometric authorization system, an enrollment request including enrollment biometric data;
making a first determination as to whether said enrollment biometric data matches first biometric data associated with one or more biometric records in a first database;
making a second determination as to whether said enrollment biometric data matches second biometric data associated with one or more biometric records in a second database;
making a third determination as to whether information contained in a plurality of matching biometric records in the first or second databases meet one or more enrollment parameters;
granting, via the biometric authorization system, said enrollment request based upon said third determination; and
notifying the user regarding enrollment based upon whether the enrollment request is granted.

34. The method of claim 33, wherein said enrollment request is encrypted.

35. The method of claim 33, further comprising receiving an identification number from one or more of said user and a system operator.

36. The method of claim 33, wherein said enrollment biometric data comprises a plurality of biometric data of a single biometric type.

37. The method of claim 33, wherein said enrollment biometric data is one or more of fingerprint data, iris data, facial data, voice data, retinal data, hand architecture data, and DNA data.

38. The method of claim 33, wherein said making a first determination transpires at a local device.

39. The method of claim 33, wherein said making a first determination transpires at a database.

40. The method of claim 33, wherein said information contained in one or more matching biometric records in the first or second databases includes one or more of positive information, negative information, and neutral information.

41. The method of claim 33, wherein said one or more enrollment parameters comprises the presence of positive information.

42. The method of claim 41, wherein if said positive information is present, said user is offered a promotion.

43. The method of claim 42, wherein said promotion includes one or more of a discount, a coupon, a gift, a contest, a merchant group promotion, an incentive, and a customer loyalty program.

44. The method of claim 33, wherein said one or more enrollment parameters comprise the presence of negative information.

45. The method of claim 33, wherein said one or more enrollment parameters comprise the presence of neutral information.

* * * * *